US012686070B2

(12) United States Patent (10) Patent No.: US 12,686,070 B2
Takada et al. (45) Date of Patent: Jul. 21, 2026

(54) GAS-SHIELDED ARC WELDING METHOD, WELDED JOINT, AND METHOD FOR PRODUCING WELDED JOINT

(71) Applicant: JFE Steel Corporation, Tokyo (JP)

(72) Inventors: Atsushi Takada, Chiyoda-ku (JP); Takahito Ito, Chiyoda-ku (JP); Seiji Fujisawa, Chiyoda-ku (JP); Atsushi Ishigami, Chiyoda-ku (JP)

(73) Assignee: JFE Steel Corporation, Tokyo (JP)

( * ) Notice: Subject to any disclaimer, the term of this patent is extended or adjusted under 35 U.S.C. 154(b) by 527 days.

(21) Appl. No.: 18/279,794

(22) PCT Filed: Mar. 11, 2022

(86) PCT No.: PCT/JP2022/010755
§ 371 (c)(1),
(2) Date: Aug. 31, 2023

(87) PCT Pub. No.: WO2022/196540
PCT Pub. Date: Sep. 22, 2022

(65) Prior Publication Data
US 2024/0307990 A1 Sep. 19, 2024

(30) Foreign Application Priority Data
Mar. 18, 2021 (JP) ................................ 2021-044201

(51) Int. Cl.
*B23K 9/16* (2006.01)
(52) U.S. Cl.
CPC ..................................... *B23K 9/16* (2013.01)
(58) Field of Classification Search
None
See application file for complete search history.

(56) References Cited

U.S. PATENT DOCUMENTS 4,465,921 A * 8/1984 Sakai ................. B23K 35/3608
219/146.24
5,945,014 A * 8/1999 Crockett .................. B23K 9/02
219/73
(Continued)

FOREIGN PATENT DOCUMENTS

CN 2418993 Y 2/2001
CN 108367376 A 8/2018
(Continued)

OTHER PUBLICATIONS

Office Action (Rejection Response Decision) issued Feb. 7, 2026, by the State Intellectual Property Office of People's Republic of China in corresponding Chinese Patent Application No. 202280018928.5 and an English machine translation with Concise Statement of Relevance of the Office Action. (13 pages).
(Continued)

*Primary Examiner* — Thor S Campbell
(74) *Attorney, Agent, or Firm* — Buchanan Ingersoll & Rooney PC

(57) ABSTRACT

A gas-shielded arc welding method is disclosed and includes joining steel materials together by narrow-gap multilayer welding. A groove between the steel materials has an groove angle θ of 20° or less, and a root gap G (mm) that is a gap at a lower portion of the groove is 7 to 15 mm. Root pass is performed in one pass using a ceramic-made backing material at a welding current I (A) of 250 to 400 A and a welding voltage V (V) of 25 to 45 V while a value [Q/G] obtained by dividing a welding heat input Q (KJ/mm) computed using a prescribed formula by the root gap G (mm) is controlled within a range of 0.32 to 0.70.

20 Claims, 3 Drawing Sheets

○ : WELDING CURRENT AND WELDING VOLTAGE WERE WITHIN RANGES OF INVENTION
△ : WELDING CURRENT AND WELDING VOLTAGE WERE OUTSIDE RANGES OF INVENTION
○ AND △ : WELDING STABILITY FAILED, OR WELDING DEFECTS OCCURRED

(56) References Cited

U.S. PATENT DOCUMENTS

| | | | | |
|---|---|---|---|---|
| 2009/0212023 A1* | 8/2009 | Messer | .................... | B23K 9/09 |
| | | | | 219/60 R |
| 2012/0175355 A1* | 7/2012 | Lalam | ...................... | B23K 9/23 |
| | | | | 219/128 |
| 2015/0117937 A1* | 4/2015 | Nakamura | ......... | B23K 35/3602 |
| | | | | 403/272 |
| 2019/0262928 A1* | 8/2019 | Kishikawa | ............. | B23K 9/127 |
| 2019/0270157 A1* | 9/2019 | Kishikawa | ........... | B23K 9/0213 |
| 2019/0366463 A1* | 12/2019 | Kishikawa | ............. | B23K 9/025 |
| 2024/0149365 A1* | 5/2024 | Ishigami | ................ | B23K 9/025 |
| 2024/0307990 A1* | 9/2024 | Takada | ................. | B23K 9/0213 |
| 2024/0391010 A1* | 11/2024 | Nakata | ................... | B23K 37/02 |

FOREIGN PATENT DOCUMENTS

| | | | | | |
|---|---|---|---|---|---|
| CN | 108890093 | A | 11/2018 | | |
| CN | 109676219 | A | 4/2019 | | |
| EP | 2929973 | A1 | 10/2015 | | |
| JP | 5111033 | A | 1/1976 | | |
| JP | 05293653 | A | 11/1993 | | |
| JP | 2745951 | B2 * | 4/1998 | | |
| JP | 2011020130 | A | 2/2011 | | |
| JP | 5345770 | B2 * | 11/2013 | ........... | C22C 38/001 |
| JP | 5861785 | B2 | 2/2016 | | |

| | | | |
|---|---|---|---|
| JP | 6568622 | B1 | 8/2019 |
| KR | 10-2016-0144494 | A | 12/2016 |
| KR | 10-2020-0118883 | A | 10/2020 |

OTHER PUBLICATIONS

"Steel Structure Design and Construction of Dalian World Trade Center", Dalian World Trade Center Co. Ltd., China Architecture & Building Press, (Dec. 30, 2002), pp. 71 with an English translation. (4 pages).

Office Action (The First Office Action) issued Nov. 21, 2025, by the State Intellectual Property Office of People's Republic of China in corresponding Chinese Patent Application No. 202280018928.5 and an English translation with Concise explanation of relevance of the Office Action. (16 pages).

Office Action (Written Decision on Registration) issued Oct. 28, 2025, by the Korean Intellectual Property Office in corresponding Korean Patent Application No. 10-2023-7029603 and an English translation of the Office Action. (6 pages).

Park et al., "A study of electrogas welding process for vertical welding joint in the shipbuilding", Welding in the World, Springer, DE, vol. 51, No. Spec. Iss, (Jul. 1, 2007), pp. 605-614, XP001518413.

The Extended European Search Report issued May 6, 2024, by the European Patent Office in corresponding European Patent Application No. 22 771 288.2. (8 pages).

International Search Report and Written Opinion for International Application No. PCT/JP2022/010755, dated May 10, 2022, 5 pages.

* cited by examiner

○: WELDING CURRENT AND WELDING VOLTAGE WERE WITHIN RANGES OF INVENTION
△: WELDING CURRENT AND WELDING VOLTAGE WERE OUTSIDE RANGES OF INVENTION
○ AND △: WELDING STABILITY FAILED, OR WELDING DEFECTS OCCURRED

GAS-SHIELDED ARC WELDING METHOD, WELDED JOINT, AND METHOD FOR PRODUCING WELDED JOINT

CROSS REFERENCE TO RELATED APPLICATIONS

This is the U.S. National Phase application of PCT/JP2022/010755, filed Mar. 11, 2022, which claims priority to Japanese Patent Application No. 2021-044201, filed Mar. 18, 2021, the disclosures of these applications being incorporated herein by reference in their entireties for all purposes.

FIELD OF THE INVENTION

The present invention relates to a gas-shielded arc welding method, a welded joint obtained using the gas-shielded arc welding method, and a method for producing the welded joint. In particular, aspects of the present invention relate to a root pass method for narrow-gap gas-shielded arc welding of steel materials.

BACKGROUND OF THE INVENTION

In recent years, steel structures such as buildings and ships are increasing in size, and the thickness of steel plates tends to increase. However, as the thickness of steel plates increases, the area of the groove increases. Therefore, the number of welding passes increases, and this causes a problem in that the labor and time required for the welding procedure increase. Another problem is that, since the workforce is decreasing, it is becoming increasingly difficult to secure welding technicians. Because of the above reasons, there is a desire to improve the efficiency of the welding procedure in production of steel structures.

One method for improving the welding procedure efficiency is to reduce the width of the groove. When the width of the groove is reduced, the area of the groove is reduced. In this case, the number of welding passes can be reduced, and the time of the procedure can be reduced. However, in narrow-gap welding, incomplete fusion tends to occur in a root pass weld, and therefore studies have been conducted to ensure a sufficient melting depth.

For example, Patent Literature 1 discloses a narrow-gap welding method. In this method, root pass is performed in two or more passes, and these passes are distributed over both sides of a bottom portion groove gap. Moreover, a feed angle of a welding wire fed from a power supply tip of a welding torch end is controlled within the range of from 5° to 15° inclusive with respect to the perpendicular. With the disclosed method, the melting depth at bottom portions of the thick steel materials can be 1.5 mm or more.

Patent Literature 2 discloses a narrow-gap welding method. In this method, a pulse voltage is repeatedly applied, and the arc length is controlled such that, when the torch reciprocated in a direction intersecting the welding direction is located at one of opposite edge portions in the groove, a buried arc is generated. With the disclosed method, a sufficient penetration depth is ensured.

Patent Literature 1 and Patent Literature 2 described above each discloses a narrow-gap welding method using a backing metal. However, the backing metal is not preferable in some cases from the viewpoint of the structural integrity of the joint. Specifically, a portion between the base material and the backing metal has a sharp notch shape and serves as a stress concentration zone. Therefore, in the welded joint using the backing metal, fatigue cracking may start from the notch portion, or the notch portion may become the origin of brittle fracture. Therefore, to avoid the presence of the notch portion described above, it may be preferable to use double-side welding using no backing metal or a welding method in which one-side welding using a ceramic-made backing material detachable after welding is performed to form a penetration bead. However, the former needs reversal of the welded joint or back chipping, and therefore this method is not a good welding method from the viewpoint of the efficiency of the procedure. The latter has a problem in that, when a non-current carrying (non-conductive) ceramic-made backing material is used in the method in any of Patent Literature 1 and Patent Literature 2 that disclose the narrow-gap welding methods, energization during welding cannot be maintained, so that the welding cannot be stabilized.

PATENT LITERATURE

PTL 1: Japanese Patent No. 5861785
PTL 2: Japanese Patent No. 6568622

SUMMARY OF THE INVENTION

To achieve narrow-gap welding capable of improving workability in a gas-shielded arc welding method for butted steel materials and to obtain a weld without using a backing metal that may serve as the origin of fatigue cracking or brittle fracture, it is an object according to aspects of the present invention to provide a narrow-gap gas-shielded arc one-side butt welding method using a ceramic-made backing material. It is another object to provide a welded joint with high structural integrity using the above welding method and a method for producing the welded joint.

The present inventors have examined conditions that allow stable procedure when a non-current carrying ceramic-made backing material is used. The inventors have conducted repeated studies and found that stable welding can be performed by controlling the welding current and the welding voltage and selecting a welding heat input suitable for the root gap to thereby form a molten pool for maintaining current-carrying ability immediately below the arc. The inventors have also found that a penetration bead with structural integrity and having no undercut can be obtained in the root pass weld.

When the backing material is made of a ceramic, the current-carrying ability cannot be obtained, and a problem arises in that the arc cannot be readily started. To address this problem, the inventors have found the following methods. Specifically, as shown in FIGS. 1 and 2, steel-made tabs with a steel-made backing material attached thereto are attached to the outer side of a joint with a ceramic-made backing material attached thereto so that an arc is generated in the steel-made tab portions. Alternatively, as shown in FIGS. 3 and 4, cut wires obtained by cutting a welding wire are sprinkled on an arc generating position within a groove. This ensures the current-carrying ability, and the arc can thereby be started.

Aspects of the present invention have been made on the basis of the above findings and completed as a result of further studies. Aspects of the present invention are summarized as follows.

[1] A gas-shielded arc welding method including: joining steel materials together by narrow-gap multilayer welding,

wherein a groove between the steel materials has an groove angle θ of 20° or less, wherein a root gap G (mm) that is a gap at a lower portion of the groove is 7 to 15 mm, and wherein root pass is performed in one pass using a ceramic-made backing material at a welding current I (A) of 250 to 400 A and a welding voltage V (V) of 25 to 45 V while a value [Q/G] obtained by dividing a welding heat input Q (KJ/mm) by the root gap G (mm) is set within a range of 0.32 to 0.70, where the welding heat input Q is given by Q=I×V/S/1000, where I is the welding current (A); V is the welding voltage (V); and S is a welding speed (mm/second).

[2] The gas-shielded arc welding method according to [1], wherein steel-made tabs are attached to an outer side of edge portions of the steel materials to be joined, and an arc is generated at the steel-made tabs.

[3] The gas-shielded arc welding method according to [1], wherein cut wires obtained by cutting a welding wire are sprinkled on an arc generating portion within the groove, and then an arc is generated.

[4] The gas-shielded arc welding method according to any one of [1] to [3], wherein, in the root pass, a welding shielding gas containing 20% by volume or more of $CO_2$ gas and an inert gas is used.

[5] The gas-shielded arc welding method according to [4], wherein the gas flow rate of the welding shielding gas is 15 to 25 L/minute.

[6] A welded joint subjected to the root pass using the gas-shielded arc welding method according to any one of [1] to [5].

[7] A method for producing a welded joint, the method using the root pass in the gas-shielded arc welding method according to any one of [1] to [5].

According to aspects of the present invention, in the gas-shielded arc one-side butt welding method for steel materials, narrow-gap welding capable of improving workability can be performed, and a weld can be formed without using a backing metal that may serve as the origin of fatigue cracking and brittle fracture. Therefore, a narrow-gap gas-shielded arc one-side butt welding method using a ceramic-made backing material, a welded joint with high structural integrity, and a method for producing the welded joint can be provided, and industrially significant effects are obtained.

4

DETAILED DESCRIPTION OF EMBODIMENTS OF THE INVENTION

Figure 1:
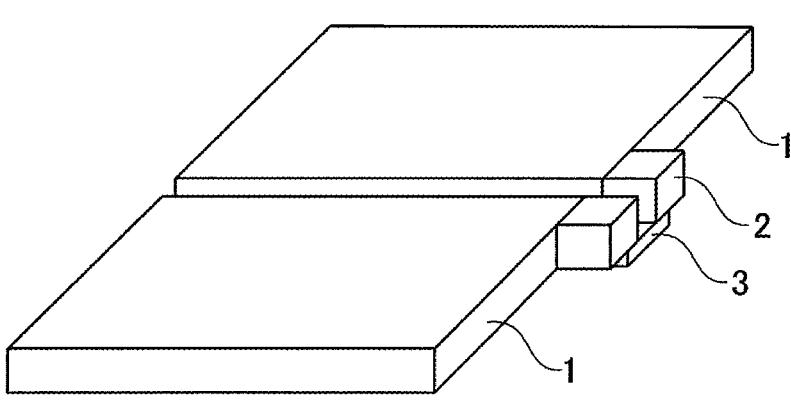
FIG. 1 is a schematic perspective view of a welded joint in one embodiment of the invention with steel-made tabs attached thereto.

One embodiment of the gas-shielded arc welding method of the present invention will first be described.

The gas-shielded arc welding method according to aspects of the invention performs one-side butt welding of steel materials. In this welding method, two steel materials having a prescribed thickness are butted with a prescribed groove therebetween, and these steel materials are joined together by gas shielded arc welding (which may be hereinafter referred to simply as "welding"). In accordance with aspects of the present invention, the welding conditions when root pass in the welding method is performed are defined.

Specifically, in the gas-shielded arc welding method, the steel materials are joined together by narrow-gap multilayer welding. The groove between the steel materials has an groove angle θ of 20° or less, and a root gap G that is the gap in a lower portion of the groove is 7 to 15 mm. Moreover, in the root pass, a ceramic-made backing material is used. The welding current I is set to 250 to 400 A, and the welding voltage V is set to 25 to 45 V. The root pass is performed in one pass while a value [Q/G] obtained by dividing the welding heat input Q (KJ/mm) by the root gap G is controlled within the range of 0.32 to 0.70.

Modes of the structural requirements according to aspects of the invention will be specifically described.

Steel Materials

The steel materials used in accordance with aspects of the present invention are in the form of a steel plate used for steel structures such as buildings and ships. No particular limitation is imposed on the type of steel so long as it is low-carbon steel. Examples of the steel materials include 400 MPa-grade steel materials, 490 MPa-grade steel materials, 550 MPa-grade steel materials, 590 MPa-grade steel materials, and 780 MPa-grade steel materials.

The plate thickness t (mm) of the steel materials is preferably in the range of 20 to 100 mm. If the plate thickness is less than 20 mm, a conventional bevel or V groove may be used. Even in this case, by reducing the root gap, the area of the groove can be smaller than the area of the groove in accordance with aspects of the present invention (a narrow groove described later) in some cases, so that the advantages of the groove in accordance with aspects of the invention (the narrow groove described later) cannot be obtained. When general rolled steel materials are used, the upper limit of their thickness is generally 100 mm. Therefore, the upper limit of the plate thickness of the steel materials used in accordance with aspects of the present invention is preferably 100 mm or less. The plate thickness t of the steel materials is more preferably 25 mm or more. The plate thickness t of the steel materials is more preferably 90 mm or less and still more preferably 70 mm or less.

Groove Angle θ

Figure 5:
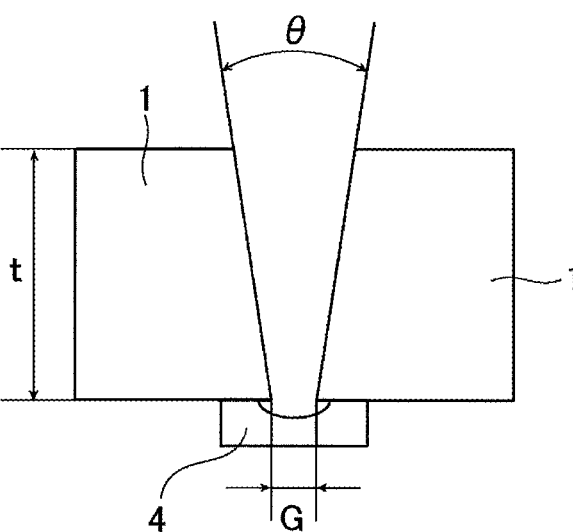
FIG. 5 is a schematic cross-sectional view showing an example of the shape of a groove in accordance with aspects of the invention.

FIG. 5 shows a thicknesswise cross-sectional view of an example of the shape of the groove between two butted steel materials. As shown in FIG. 5, the angle between the groove face of the groove between the butted steel materials 1 is defined as an groove angle θ)(°. In accordance with aspects of the present invention, the groove angle θ of the groove used is 20° or less. In accordance with aspects of the present invention, the groove having an groove angle θ of 20° or less is referred to as a "narrow groove." This is because, if e exceeds 20°, the improvement in efficiency, which is an advantage of the narrow groove, is reduced.

The smaller the groove between steel plates, the higher the achievable efficiency of the welding. Therefore, even when the groove angle θ is 0°, the effects according to aspects of the invention can be obtained. The groove angle θ is more preferably 5° or more and still more preferably 10° or more.

Root Gap G

As shown in FIG. 5, in accordance with aspects of the present invention, the root gap that is the narrowest bottom gap of the groove between the butted steel materials 1 is denoted by G (mm). The root gap G in accordance with aspects of the present invention is 7 to 15 mm. This is because, if G is less than 7 mm, it is difficult to insert a welding torch into the groove and because, if G exceeds 15 mm, the improvement in efficiency, which is an advantage of the narrow groove, is reduced. Therefore, G is 7 to 15 mm. G is preferably 8 mm or more and is preferably 13 mm or less.

Ceramic-Made Backing Material

In the gas-shielded arc welding in accordance with aspects of the present invention, the ceramic-made backing material that can be detached after the welding is used as a backing material for preventing burn-through. No particular limitation is imposed on the ceramic-made backing material, so long as it can prevent burn-through and form a penetration bead. The ceramic-made backing material used may have, for example, a chemical composition containing, in % by mass, $SiO_2$: 30 to 70%, $Al_2O_3$: 10 to 50%, MgO: 3 to 20%, $ZrO_2$: 0 to 10%, and at least one selected from NaO, $K_2O_3$, and $Li_2O$: 0.3 to 5% in total.

A ceramic-made backing material with glass fibers laminated thereon may also be used.

Welding Current I

If the welding current I (A) in the root pass is lower than 250 A, the arc pressure is low. In this case, an unmelted portion remains on the bottom portion of the groove, and an undercut is formed. If the welding current I (A) in the root pass is larger than 400 A, the arc pressure becomes high. In this case, the molten pool for maintaining the current-carrying ability is pushed away, and the arc cannot be maintained. Therefore, the welding current I (A) in the root pass is 250 to 400 A. The welding current I (A) is preferably 270 A or larger and more preferably 280 A or larger. The welding current I (A) is preferably 380 A or lower, more preferably 360 A or lower, and still more preferably 350 A or lower.

Welding Voltage V

If the welding voltage V (V) in the root pass is lower than 25 V, the arc cannot be maintained stably. In this case, the welding is unstable, and the weld bead has a convex shape. If the welding voltage V (V) in the root pass is higher than 45 V, the position at which the arc is generated is high, and the heat of the molten pool is unlikely to reach the bottom portion of the groove. In this case, an unmelted portion remains in the bottom portion of the groove, and an undercut is formed. Therefore, the welding voltage V (V) in the root pass is 25 to 45 V. The welding voltage V (V) is preferably 28 V or higher and more preferably 30 V or higher. The welding voltage V (V) is preferably 40 V or lower and more preferably 38 V or lower.

Welding Speed S

The range of the welding speed S in the root pass is preferably 1 to 8 mm/second.

If the welding speed S is outside the above range, the heat input is excessively large or small even when the current and voltage are appropriate. In this case, welding defects occur, or the arc is not easily maintained. The welding speed S is more preferably 1.2 mm/second or more. The welding speed S is more preferably 6 mm/second or less. The welding speed S can be appropriately selected within the above range according to the balance between the welding current I and the welding voltage V.

Welding Heat Input Q

To maintain the molten pool for maintaining the current-carrying ability at a position immediately below the arc to thereby prevent an undercut, it is necessary to control the welding heat input Q (KJ/mm) by adjusting the root gap G (mm). Therefore, the value [Q/G] obtained by dividing the welding heat input Q by the root gap G is adjusted within the range of 0.32 to 0.70.

Let the welding current (A) be I, the welding voltage (V) be V, and the welding speed (mm/second) be S. Then the welding heat input Q (KJ/mm) can be determined from the formula [I×V/S/1000].

If the value of Q/G is smaller than 0.32, the molten pool for maintaining the current-carrying ability is small. In this case, the torch precedes the molten pool, and the arc cannot be maintained, so that the welding is unstable. If the value of Q/G is larger than 0.70, the liquid level of the molten pool is high, and the input heat does not reach the lower portion of the groove. In this case, an unmelted portion remains in the lower portion of the groove, and an undercut is formed. Therefore, the value of Q/G described above is limited to the range of 0.32 to 0.70. The value of Q/G is preferably 0.40 or more and more preferably 0.43 or more. The value of Q/G is preferably 0.67 or less, more preferably 0.60 or less, and still more preferably 0.58 or less.

Polarity of Welding

The polarity of the welding, i.e., the root pass, may be selected from any of straight polarity (in which the steel materials are connected with the positive terminal and the welding wire is connected with the negative terminal) and reverse polarity (in which the steel materials are connected with the negative terminal and the welding wire is connected with the positive terminal).

Welding Wire

The welding wire used in accordance with aspects of the present invention may be any of various wires with different specifications. Examples of the welding wire include YGW11, YGW18, G59JA1UC3M1T, G78A2UCN4M4T, G49AP3M1T, G59JA1UMC1M1T, and G78A4MN5 CM3T that are classified according to JIS Z 3312. The diameter φ of the wire is preferably 1.0 to 1.4 mm.

Welding Shielding Gas

The welding shielding gas used is preferably a gas mixture having a chemical composition containing 20% by volume or more of $CO_2$ gas with the balance being an inert gas such as Ar, in order to stabilize the arc. In consideration of the cost of the welding shielding gas, it is more preferable that the amount of $CO_2$ gas is 100% by volume. From the viewpoint of stabilizing the arc and preventing the occurrence of welding defects, the flow rate of the gas is preferably 15 to 25 L/min.

Arc Starting Method

To ensure the current-carrying ability at the start of the arc, any of the following two methods, for example, is used. In the first method, steel-made tabs are attached to edge portions (to the outside of the edge portions), with respect to the direction of the weld seam, of the steel materials to be joined, and an arc is generated at the steel-made tabs. In the other method, cut wires obtained by cutting the welding wire are sprinkled onto an arc generating portion within the groove, and then an arc is generated.

Figure 2:
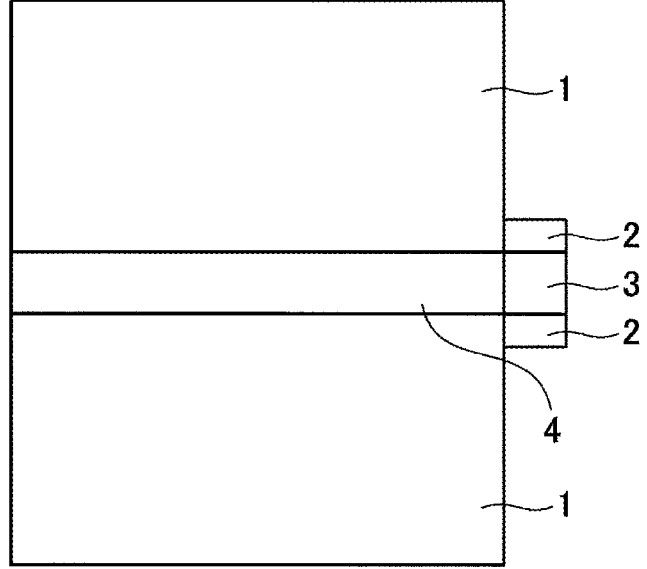
FIG. 2 is a schematic back view of the welded joint shown in FIG. 1 with the steel-made tabs attached thereto.
Figure 3:
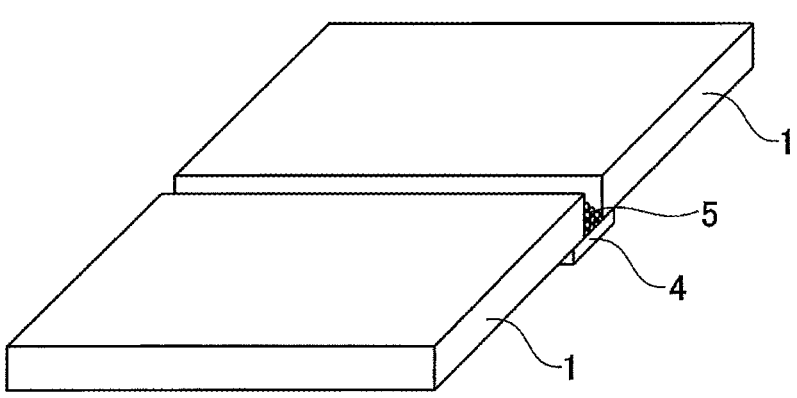
FIG. 3 is a schematic perspective view of a welded joint according to another embodiment of the invention in which sprinkled cut wires are used for an arc starting method.
Figure 4:
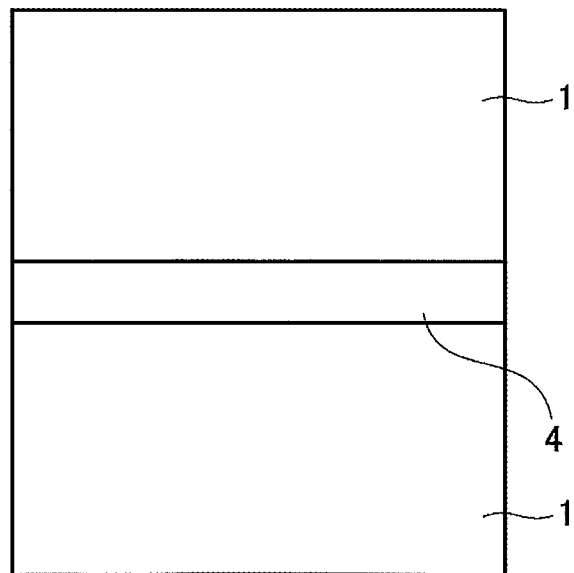
FIG. 4 is a schematic back view of the welded joint in which the sprinkled cut wires are used for the arc starting method shown in FIG. 3.

Specifically, as shown in FIGS. 1 and 2, it is preferable to start the arc at the positions of steel-made tabs 2 that use a steel-made backing material 3 and are disposed at edges of steel materials 1 that are to form a welded joint. Alternatively, as shown in FIGS. 3 and 4, it is preferable that the welding wire is cut to a length of, for example, 3 mm to obtain cut wires and 2 grams of the cut wires are disposed in the art starting portion.

The steel-made tabs 2 are steel-made members attached to edge portions, with respect to the direction of the weld seam, of the steel materials 1 (i.e., their starting edge portions with respect to the direction of the weld seam) in order to generate an arc effectively at the edge portions of the steel materials. The steel-made backing material 3 is a member abutting on the bottom side of the steel-made tabs 2. No particular limitation is imposed on the material of these members, and a general steel material (such as SM490) can be used.

As shown in the example in FIGS. 1 and 2, the "steel-made tabs 2" include two steel-made tabs 2 disposed on the upper surface of one steel-made backing material 3 with a prescribed space therebetween. The steel-made tabs 2 are disposed at the respective starting edge portions, with respect to the direction of the weld seam, of the two steel materials 1. As shown in FIG. 2, the steel-made backing material 3 is disposed on the back side of the pair of steel-made tabs 2, and a ceramic-made backing material 4 is disposed adjacent to the steel-made backing material 3.

The cut wires are obtained by cutting the welding wire to a short length as described above. In accordance with aspects of the present invention, it is preferable to sprinkle the cut wires onto the bottom portion of the groove so that the generation of the arc is facilitated. As shown in the example in FIGS. 3 and 4, the art starting portion is a region formed by the one-side butt surfaces of the two steel materials 1 and the ceramic-made backing material 4 disposed so as to overlap the bottom surfaces of the two steel materials 1. The upper side of the ceramic-made backing material 4 in this region serves as "the bottom portion of the groove" described above (see FIG. 3).

Multilayer Welding

Aspects of the present invention are applied to root pass of a narrow groove using the ceramic-made backing material. To carry out aspects of the present invention, the welding conditions for passes following the root pass are appropriately set. The number of layers in the second and subsequent welding passes after the root pass depends on the thickness of the steel materials etc. When the thickness is 20 to 100 mm as described above, the number of layers is preferably 3 to 16. The welding conditions for the passes following the root pass are preferably, for example, a welding current of 180 to 400 A, a welding voltage of 24 to 45 V, and a welding speed of 1 to 10 mm/second.

Next, embodiments of the welded joint of the invention and the method for producing the welded joint of the invention will be described.

The welded joint (gas-shielded arc welded joint) according to aspects of the invention is a welded joint produced by subjecting two butted steel materials to root pass using the gas-shielded arc welding method described above.

The method for producing the welded joint according to aspects of the invention includes: the step of butting two steel materials against each other such that groove face of the two steel materials form a groove with a prescribed groove angle θ and that the root gap G in the lower portion of the groove is a prescribed distance; and a welding step of performing multilayer welding using the welding wire described above under welding conditions specific to the steel materials to thereby form a weld bead. In this manner, the two butted steel materials are joined together, and a welded joint is thereby produced. In this production method, the above-described gas-shielded arc welding method is applied to the root pass in the multilayer welding in the welding step.

The welding conditions for the passes following the root pass are appropriately set and may be, for example, the same as the welding conditions for the root pass or may be the same as the welding conditions described for the multilayer welding. The descriptions of the steel plates, the welding conditions, etc. are the same as those described above and will be omitted.

As described above, with the welding method according to aspects of the invention including the root pass described above, the narrow-gap welding capable of improving the operability can be achieved, and a weld can be obtained without using a backing metal that may serve as the origin of fatigue cracking and brittle fracture. Moreover, a welded joint with high structural integrity can be obtained. In accordance with aspects of the present invention, the "high structural integrity" means that no welding defects such as undercuts, overlaps, and incomplete fusion are formed.

EXAMPLES

Example 1

As shown in FIG. 5, two steel plates (steel materials 1) were butted against each other to form a groove, and the ceramic-made backing material 4 was disposed on the bottom surface of the groove. Then a welded joint was produced using the one-side gas shielded arc welding. The welding shielding gas used was 100% by volume of $CO_2$ gas. The flow rate of the welding shielding gas was 20 L/minute.

The welding wire used was a wire with ϕ1.2 mm and was one of YGW11, YGW18, G59JA1UC3M1T, and G78A2UCN4M4T classified according to JIS Z 3312. The thickness t of the steel materials 1, the groove angle θ, and the root gap G are shown in Table 1. The root pass in the one-side gas shielded arc welding was performed under conditions shown in Table 1. The welding for the second and subsequent layers was performed at a welding current of 250 to 300 A, a welding voltage of 28 to 35 V, and a welding speed in the range of 6 to 8 mm/second. The ceramic-made backing material 4 used was a backing material having a chemical composition containing, in % by mass, $SiO_2$: 30 to 70%, $Al_2O_3$: 10 to 50%, MgO: 3 to 20%, $Zro_2$: 0 to 10%, and at least one selected from NaO, $K_2O_3$, and $Li_2O$: 0.3 to 5% in total, as described above. "Polarity" in Table 1 represents the polarity of the welding. "Wire negative" means the straight polarity described above, and "Wire positive" means the reverse polarity described above.

The conditions for tests and the methods for evaluating the tests are as follows.

The test conditions and the evaluation results are summarized in Table 1.

The arc starting method for joint No. 14 in Table 1 is as follows. Specifically, an arc was generated in a lower portion of the groove on one side at 280 A-32 V and held for 1 second to maintain a molten pool for ensuring the current-carrying ability. Then the torch was moved to the central portion of the groove, and the welding was performed at a welding speed of 3.0 mm/second.

TABLE 1

| Joint No. | Steel type (grade) | Thickness t (mm) | Groove angle θ (°) | Root gap G (mm) | Welding wire (specifications) | Arc starting method | Welding conditions Polarity |
|---|---|---|---|---|---|---|---|
| 1 | 490 MPa grade | 20 | 5 | 7 | YGW11 | Steel-made tabs | Wire negative |
| 2 | 550 MPa grade | 40 | 10 | 10 | YGW18 | Steel-made tabs | Wire negative |
| 3 | 590 MPa grade | 60 | 15 | 15 | G59JA1UC3M1T | Steel-made tabs | Wire negative |
| 4 | 780 MPa grade | 40 | 20 | 12 | G78A2UCN4M4T | Cut wires | Wire negative |
| 5 | 490 MPa grade | 40 | 0 | 9 | YGW11 | Cut wires | Wire positive |
| 6 | 550 MPa grade | 35 | 0 | 9 | YGW18 | Steel-made tabs | Wire positive |
| 7 | 550 MPa grade | 20 | 5 | 14 | YGW18 | Steel-made tabs | Wire negative |
| 8 | 550 MPa grade | 30 | 5 | 10 | YGW18 | Steel-made tabs | Wire negative |
| 9 | 490 MPa grade | 30 | 10 | 10 | YGW11 | Cut wires | Wire positive |
| 10 | 490 MPa grade | 40 | 10 | 8 | YGW11 | Cut wires | Wire positive |
| 11 | 490 MPa grade | 30 | 5 | 13 | YGW11 | Steel-made tabs | Wire positive |
| 12 | 490 MPa grade | 30 | 0 | 8 | YGW11 | Steel-made tabs | Wire negative |
| 13 | 490 MPa grade | 30 | 0 | 12 | YGW11 | Steel-made tabs | Wire positive |
| 14 | 490 MPa grade | 20 | 20 | 7 | YGW11 | Lower portion of groove | Wire positive |

| | Welding conditions | | | | | | | |
|---|---|---|---|---|---|---|---|---|
| Joint No. | Welding current I (A) | Welding voltage V (V) | Welding speed S (mm/sec) | Welding heat input Q (kJ/mm) | Q/G | Welding stability | Welding defects | Remarks |
| 1 | 300 | 34 | 2.5 | 4.1 | 0.58 | Pass | No | Inventive Example |
| 2 | 400 | 45 | 2.7 | 6.7 | 0.67 | Pass | No | Inventive Example |
| 3 | 250 | 25 | 1.2 | 5.2 | 0.35 | Pass | No | Inventive Example |
| 4 | 300 | 38 | 2.4 | 4.8 | 0.40 | Pass | No | Inventive Example |
| 5 | 380 | 38 | 2.8 | 5.2 | 0.57 | Pass | No | Inventive Example |
| 6 | 280 | 30 | 2.3 | 3.7 | 0.41 | Pass | No | Inventive Example |
| 7 | 420 | 45 | 5.1 | 3.7 | 0.26 | Fail | Yes | Comparative Example |
| 8 | 230 | 25 | 2.0 | 2.9 | 0.29 | Fail | Yes | Comparative Example |
| 9 | 250 | 30 | 3.2 | 2.3 | 0.23 | Fail | Yes | Comparative Example |
| 10 | 400 | 38 | 2.5 | 6.1 | 0.76 | Pass | Yes | Comparative Example |
| 11 | 220 | 25 | 1.0 | 5.5 | 0.42 | Pass | Yes | Comparative Example |
| 12 | 350 | 48 | 5.6 | 3.0 | 0.38 | Pass | Yes | Comparative Example |
| 13 | 450 | 43 | 4.8 | 4.0 | 0.34 | Fail | Yes | Comparative Example |
| 14 | 280 | 32 | 3.0 | 3.0 | 0.43 | Pass | No | Inventive Example |

[Welding Stability]

The welding stability was evaluated as follows. In the root pass (one pass), when the welding could be performed over a welding length of 400 mm without interruption until the end, a "Pass" rating was given. When the welding could not be performed until the end, a "Fail" rating was given.

[Welding Defects]

A cross-sectional macro sample was taken from the central position, with respect to the direction of the weld seam, of one of the obtained welded joints. Using this cross-sectional macro sample, the presence or absence of welding defects in the root pass bead was evaluated using optical microscope observation. The magnification of the optical microscope was set to 10×. When no welding defects (see JIS Z 3001-4: 2013) were found in the root pass bead, a "No" was given. When welding defects such as undercuts, overlaps, or incomplete fusion (see JIS Z 3001-4: 2013) were found, a "Yes" was given.

Figure 6:
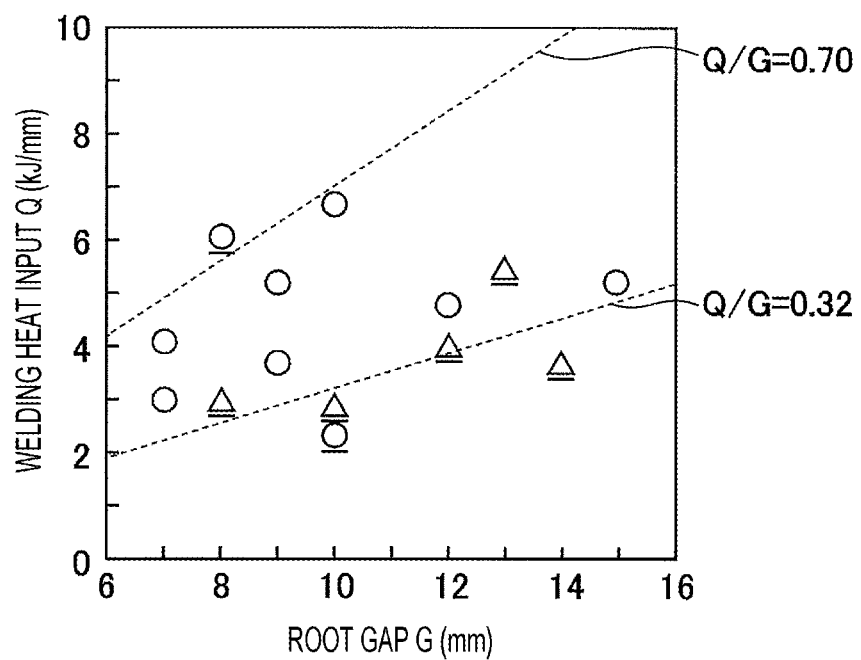
FIG. 6 is a correlation diagram showing the correlation between a welding heat input Q and a root gap G in accordance with aspects of the invention.

Based on the results in Table 1, the correlation between the root gap G and the welding heat input Q is shown in FIG. 6. As can be seen from these results, in each of Inventive Examples in which the welding current I in the root pass was 250 to 400 A, in which the welding voltage V was 25 to 45 V, and in which Q/G was in the range of 0.32 to 0.70, even when the ceramic-made backing material was used for the narrow groove, the welding stability was good, and no welding defects occurred.

However, in Comparative Examples in which, although Q/G was within the above range, the welding current I or the welding voltage V in the root pass was outside the range of the invention, the welding stability was poor, or welding defects occurred.

In Comparative Examples in which Q/G was outside the above range, the welding stability was poor, or welding defects occurred.

Example 2

In Example 2, two steel plates having a thickness t shown in Table 2 were used, and the root pass in the one-side gas shielded arc welding was performed using a welding shielding gas shown in Table 2 under conditions shown in Table 2 to thereby produce a welded joint. Other conditions, the evaluation methods, etc. are the same as those in Example 1, and their description will be omitted.

(mm) that is a gap at a lower portion of the groove is 7 to 15 mm, and wherein root pass is performed in one pass using a ceramic-made backing material at a welding current I (A) of 250 to 400 A and a welding voltage V (V) of 25 to 45 V while a value [Q/G] obtained by dividing a welding heat input Q (kJ/mm) by the root gap G (mm) is set within a range of 0.32 to 0.70,

TABLE 2

| Joint No. | Steel type (grade) | Thickness t (mm) | Groove angle θ (°) | Root gap G (mm) | Welding wire (specifications) | Wire diameter φ (mm) | Arc starting method | Welding shielding gas | Flow rate of gas (L/min) |
|---|---|---|---|---|---|---|---|---|---|
| 15 | 490 MPa grade | 20 | 5 | 7 | G49AP3M1T | 1.0 | Steel-made tabs | $CO_2$: 20% by volume + Ar: 80% by volume | 15 |
| 16 | 590 MPa grade | 40 | 10 | 10 | G59JA1UMC1M1T | 1.4 | Steel-made tabs | $CO_2$: 25% by volume + Ar: 75% by volume | 25 |
| 17 | 780 MPa grade | 40 | 20 | 12 | G78A2UCN4M4T | 1.0 | Steel-made tabs | $CO_2$: 50% by volume + Ar: 50% by volume | 20 |
| 18 | 490 MPa grade | 40 | 0 | 9 | YGW11 | 1.2 | Cut wires | $CO_2$: 80% by volume + Ar: 2% by volume | 25 |
| 19 | 550 MPa grade | 35 | 0 | 9 | YGW18 | 1.2 | Cut wires | $CO_2$: 50% by volume + Ar: 50% by volume | 20 |
| 20 | 780 MPa grade | 40 | 20 | 12 | G78A4MN5CM3T | 1.2 | Steel-made tabs | $CO_2$: 20% by volume + Ar: 80% by volume | 15 |
| 21 | 490 MPa grade | 40 | 0 | 10 | YGW11 | 1.2 | Steel-made tabs | Ar: 100% by volume | 20 |
| 22 | 490 MPa grade | 40 | 0 | 10 | YGW11 | 1.2 | Steel-made tabs | $CO_2$: 100% by volume | 10 |
| 23 | 490 MPa grade | 40 | 20 | 8 | YGW11 | 1.2 | Steel-made tabs | $CO_2$: 100% by volume | 20 |

| Joint No. | Polarity | Welding current I (A) | Welding voltage V (V) | Welding speed S (mm/sec) | Welding heat input Q (kJ/mm) | Q/G | Welding stability | Welding defects | Remarks |
|---|---|---|---|---|---|---|---|---|---|
| 15 | Wire negative | 300 | 34 | 2.5 | 4.1 | 0.58 | Pass | No | Inventive Example |
| 16 | Wire negative | 400 | 45 | 2.7 | 6.7 | 0.67 | Pass | No | Inventive Example |
| 17 | Wire negative | 300 | 38 | 2.4 | 4.8 | 0.40 | Pass | No | Inventive Example |
| 18 | Wire negative | 300 | 38 | 2.4 | 4.8 | 0.53 | Pass | No | Inventive Example |
| 19 | Wire positive | 380 | 38 | 2.8 | 5.2 | 0.57 | Pass | No | Inventive Example |
| 20 | Wire positive | 350 | 38 | 3.2 | 4.2 | 0.35 | Pass | No | Inventive Example |
| 21 | Wire negative | 200 | 27 | 2.0 | 2.7 | 0.27 | Fail | Yes | Comparative Example |
| 22 | Wire negative | 300 | 38 | 1.5 | 7.6 | 0.76 | Pass | Yes | Comparative Example |
| 23 | Wire negative | 380 | 44 | 6.0 | 2.8 | 0.35 | Pass | No | Inventive Example |

As shown in Table 2, in Inventive Examples, the welding stability was good, and no welding defects occurred. However, in Comparative Examples, since the amount of $CO_2$ gas mixed with the composition of the welding shielding gas was less than 20% by volume or the flow rate of the gas was insufficient, the welding stability was poor and/or welding defects occurred.

REFERENCE SIGNS LIST 1 steel material
2 steel-made tab
3 steel-made backing material
4 ceramic-made backing material
5 cut wire the invention claimed is:

1. A gas-shielded arc welding method comprising:
joining steel materials together by narrow-gap multilayer welding,
wherein a groove between the steel materials has an groove angle θ of 20° or less, wherein a root gap G where the welding heat input Q is given by Q=I×V/S/1000, where I is the welding current (A); V is the welding voltage (V); and S is a welding speed (mm/second).

2. The gas-shielded arc welding method according to claim 1, wherein steel-made tabs are attached to an outer side of edge portions of the steel materials to be joined, and an arc is generated at the steel-made tabs.

3. The gas-shielded arc welding method according to claim 1, wherein cut wires obtained by cutting a welding wire are sprinkled on an arc generating portion within the groove, and then an arc is generated.

4. The gas-shielded arc welding method according to claim 1, wherein, in the root pass, a welding shielding gas containing 20% by volume or more of $CO_2$ gas and an inert gas is used.

5. The gas-shielded arc welding method according to claim 2, wherein, in the root pass, a welding shielding gas containing 20% by volume or more of $CO_2$ gas and an inert gas is used.

6. The gas-shielded arc welding method according to claim 3, wherein, in the root pass, a welding shielding gas containing 20% by volume or more of $CO_2$ gas and an inert gas is used.

7. The gas-shielded arc welding method according to claim 4, wherein the gas flow rate of the welding shielding gas is 15 to 25 L/minute.

8. The gas-shielded arc welding method according to claim 5, wherein the gas flow rate of the welding shielding gas is 15 to 25 L/minute.

9. The gas-shielded arc welding method according to claim 6, wherein the gas flow rate of the welding shielding gas is 15 to 25 L/minute.

10. A welded joint subjected to the root pass using the gas-shielded arc welding method according to claim 1.

11. A welded joint subjected to the root pass using the gas-shielded arc welding method according to claim 2.

12. A welded joint subjected to the root pass using the gas-shielded arc welding method according to claim 3.

13. A welded joint subjected to the root pass using the gas-shielded arc welding method according to claim 4.

14. A welded joint subjected to the root pass using the gas-shielded arc welding method according to claim 5.

15. A method for producing a welded joint, the method using the root pass in the gas-shielded arc welding method according to claim 1.

16. A method for producing a welded joint, the method using the root pass in the gas-shielded arc welding method according to claim 2.

17. A method for producing a welded joint, the method using the root pass in the gas-shielded arc welding method according to claim 3.

18. A method for producing a welded joint, the method using the root pass in the gas-shielded arc welding method according to claim 4.

19. A method for producing a welded joint, the method using the root pass in the gas-shielded arc welding method according to claim 5.

20. A method for producing a welded joint, the method using the root pass in the gas-shielded arc welding method according to claim 6.

\* \* \* \* \*